United States Patent
Tsien et al.

(10) Patent No.: US 7,359,727 B2
(45) Date of Patent: Apr. 15, 2008

(54) SYSTEMS AND METHODS FOR ADJUSTING TRANSMIT POWER IN WIRELESS LOCAL AREA NETWORKS

(75) Inventors: Chih C Tsien, San Diego, CA (US); Jiewen Liu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 859 days.

(21) Appl. No.: 10/738,410

(22) Filed: Dec. 16, 2003

(65) Prior Publication Data
US 2005/0128970 A1 Jun. 16, 2005

(51) Int. Cl.
*H04Q 7/20* (2006.01)
(52) U.S. Cl. .................. 455/522; 370/208
(58) Field of Classification Search .......... 455/69, 455/522, 506, 63.1, 53.4, 703; 370/318, 370/332, 203, 441, 208, 328, 335, 206, 252, 370/320, 480, 338, 282
See application file for complete search history.

(56) References Cited

U.S. PATENT DOCUMENTS

| | | | |
|---|---|---|---|
| 4,638,476 A | 1/1987 | Acampora et al. | |
| 5,465,398 A | 11/1995 | Flammer | |
| 5,564,075 A | 10/1996 | Gourgue | |
| 5,706,428 A | 1/1998 | Boer et al. | |
| 6,321,082 B1 | 11/2001 | Katz | |
| 6,385,462 B1 | 5/2002 | Baum et al. | |
| 6,741,861 B2 | 5/2004 | Bender et al. | |
| 6,859,656 B2 | 2/2005 | Choi et al. | |
| 7,027,407 B2 | 4/2006 | Diepstraten et al. | |

| | | | |
|---|---|---|---|
| 2002/0036994 A1 | 3/2002 | Huh et al. | |
| 2002/0154611 A1 | 10/2002 | Khullar | |

(Continued)

FOREIGN PATENT DOCUMENTS

EP 1204225 A1 5/2002

(Continued)

OTHER PUBLICATIONS

"International Search Report filed in corresponding PCT Application No. PCT/US2004/039483", (Mar. 18, 2005), 3 pgs.

(Continued)

*Primary Examiner*—Tu Nguyen
(74) *Attorney, Agent, or Firm*—Schwegman, Lundberg & Woessner, P.A.; Gregory J. Gorrie (57) ABSTRACT

A communication station performs closed-loop transmit power control and adjusts its transmit power level based on an access point sensitivity, a path loss and/or a link margin variation. An average received power level of orthogonal frequency-division multiplexed (OFDM) subcarriers of an OFDM channel may be measured at the communication station, and the path loss may be estimated from an access point transmit power level and the measured power level. The communication station may request an access point's transmit power level and link margin from the access point prior to estimating the path loss. The communication station may calculate the access point sensitivity by subtracting the path loss and the access point link margin from the communication station's transmit power level. The link margin variation may be estimated from an access point transmit power variation, an indoor path loss variation, and/or a receiver power measurement error of the communication station.

24 Claims, 3 Drawing Sheets

U.S. PATENT DOCUMENTS

| | | | |
|---|---|---|---|
| 2002/0168993 A1* | 11/2002 | Choi et al. | 455/522 |
| 2003/0003905 A1 | 1/2003 | Shvodian | |
| 2004/0057507 A1 | 3/2004 | Rotstein et al. | |
| 2004/0082356 A1* | 4/2004 | Walton et al. | 455/522 |
| 2004/0151109 A1* | 8/2004 | Batra et al. | 370/208 |

FOREIGN PATENT DOCUMENTS

| | | |
|---|---|---|
| EP | 1207644 A2 | 5/2002 |
| WO | WO-2005/062491 A1 | 7/2005 |

OTHER PUBLICATIONS

"U.S. Appl. No. 10/314,411 Final Office Action mailed Aug. 9, 2006", 15 pgs.

"U.S. Appl. No. 10/314,411 Final Office Action mailed Sep. 13, 2005", 22 pgs.

"U.S. Appl. No. 10/314,411 Non-Final Office Action mailed Jan. 23, 2007", 19 pgs.

"U.S. Appl. No. 10/314,411 Non-Final Office Action mailed Mar. 9, 2006", 19 pgs.

"U.S. Appl. No. 10/314,411 Non-Final Office Action mailed Apr. 19, 2005", 11 pgs.

"U.S. Appl. No. 10/314,411 Notice of Allowance mailed Sep. 28, 2007", 3 pgs.

"U.S. Appl. No. 10/314,411 Response filed Jun. 9, 2006 in response to Non-Final Office Action mailed Mar. 9, 2006", 12 pgs.

"U.S. Appl. No. 10/314,411 Response filed Jun. 25, 2007 in response to Non-Final Office Action mailed Jan. 23, 2007", 13 pgs.

"U.S. Appl. No. 10/314,411 Response filed Jul. 19, 2005 in response to Non-Final Office Action mailed Apr. 19, 2005", 11 pgs.

"U.S. Appl. No. 10/314,411 Response filed Nov. 9, 2006 in response to Final Office Action mailed Aug. 9, 2006", 13 pgs.

"U.S. Appl. No. 10/314,411 Response filed Dec. 30, 2005 in response to Final Office Action mailed Sep. 13, 2005", 15 pgs.

* cited by examiner

SYSTEMS AND METHODS FOR ADJUSTING TRANSMIT POWER IN WIRELESS LOCAL AREA NETWORKS

TECHNICAL FIELD

Embodiments of the invention pertain to wireless communications and, in some embodiments, to wireless local area networks (WLANS) including WLANs that use orthogonal frequency-division multiplexed (OFDM) communications.

BACKGROUND

In many WLANs, the transmit power of a communication device is initially set at one of several predetermined levels at initialization and may remain at the set level for subsequent communications. As environmental factors change and as communication devices change locations, the initially set transmit power level may either no longer be sufficient or may be excessive. Thus, there are general needs for methods and systems for adjusting transmit power level dynamically in a WLAN environment.

BRIEF DESCRIPTION OF THE DRAWINGS

The appended claims are directed to some of the various embodiments of the invention. However, the detailed description presents a more complete understanding of embodiments of the invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
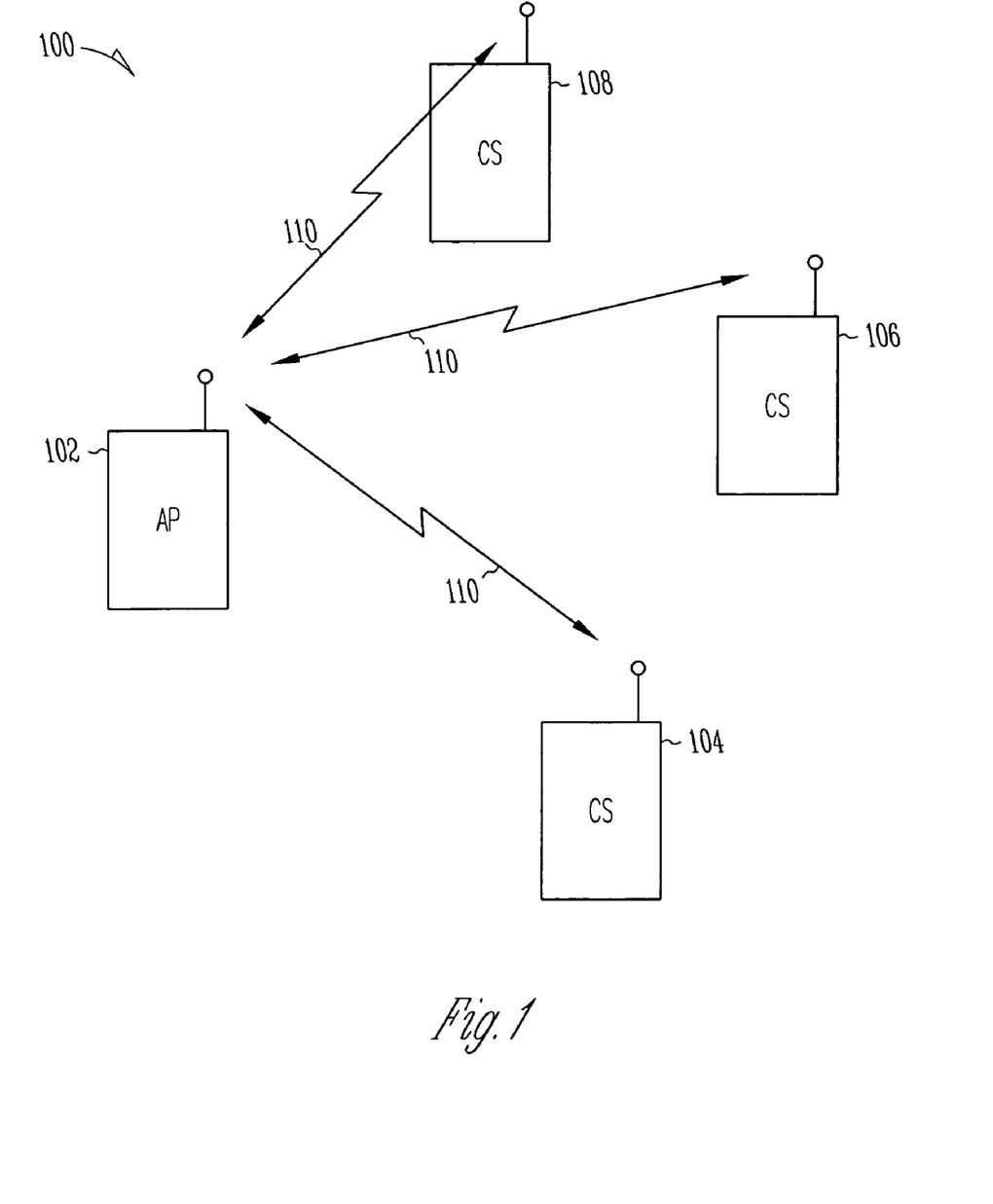
FIG. 1 illustrates an operational environment in accordance with some embodiments of the invention.

FIG. 1 illustrates an operational environment in accordance with some embodiments of the invention. Operational environment 100 includes one or more communication stations (CS) 104, 106 and 108 which may communicate with access point (AP) 102 over links 110. In accordance with some embodiments, communication stations 104, 106 and/or 108 may implement closed-loop transmit power control to adjust their transmit power level. The adjusted power level may be based on access point sensitivity, path loss and link margin variation. This is discussed in more detail below.

Communication stations 104, 106 and/or 108 may include, for example, personal digital assistants (PDAs), laptop and portable computers with wireless communication capability, web tablets, wireless telephones, wireless headsets, pagers, instant messaging devices, digital cameras, and other devices that may receive and/or transmit information wirelessly. Communication stations 104, 106 and/or 108 may communicate with access point 102 using a multi-carrier transmission technique, such as an orthogonal frequency division multiplexing technique that uses orthogonal subcarriers to transmit information within an assigned spectrum, although the scope of the invention is not limited in this respect.

In addition to facilitating communications between communication stations 104, 106 and/or 108, access point 102 may be coupled with one or more networks, such as an intranet or the Internet, allowing communication stations 104, 106 and/or 108 to access such networks. Although environment 100 illustrates point-to-point communications, embodiments of the invention are suitable to point-to-multipoint communications. In these embodiments, communication stations 104, 106 and/or 108 may communicate directly (i.e., without the use of access point 102) and may control their transmit power level in accordance with the teachings herein.

In some embodiments, access point 102 and communication stations 104, 106 and/or 108 may communicate orthogonal frequency-division multiplexed (OFDM) communication signals. In some embodiments, access point 102 and communication stations 104, 106 and/or 108 may communicate OFDM packets on a single channel, referred to herein as a subchannel. In some embodiments, access point 102 and communication stations 104, 106 and/or 108 may communicate OFDM packets on a wideband communication channel. In these embodiments, the wideband channel may comprise one or more subchannels. The subchannels may be frequency-division multiplexed (i.e., separated in frequency) and may be within a predetermined frequency spectrum. The subchannels may be comprised of a plurality of orthogonal subcarriers. In some embodiments, the orthogonal subcarriers of a subchannel may be closely spaced OFDM subcarriers. To achieve orthogonality between closely spaced subcarriers, in some embodiments the subcarriers of a particular subchannel may have a null at substantially a center frequency of the other subcarriers of that subchannel. In some embodiments, the subchannels may have a bandwidth of substantially 20 MHz, although subchannels having narrower or wider bandwidths are also suitable.

In some embodiments, the frequency spectrums for a subchannel may include either a 5 GHz frequency spectrum or a 2.4 GHz frequency spectrum, although the scope of the invention is not limited in this respect. In some embodiments, the frequency spectrums for a wideband channel may comprise more than one subchannel in either the 5 GHz frequency spectrum or the 2.4 GHz frequency spectrum, although the scope of the invention is not limited in this respect. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums may be equally suitable.

In some embodiments, access point 102 and communication stations 104, 106 and/or 108 may communicate substantially in accordance with specific communication standards, such as the Institute of Electrical and Electronics Engineers (IEEE) standards including the IEEE 802.11(a/h), 802.11(b), 802.11(g) 802.11(n) and/or 802.16 standards for wireless local area networks, although access point 102 and communication stations 104, 106 and/or 108 may also be suitable to transmit and/or receive communications in accordance with other techniques including the Digital Video Broadcasting Terrestrial (DVB-T) broadcasting standard, and the High performance radio Local Area Network (HiperLAN) standard.

In accordance with some embodiments, a communication station, such as communication station 104 may adjust its transmit power level based on an access point sensitivity of access point 102, a path loss and a link margin variation. A received power level may be measured at communication station 104, and the path loss may be estimated from an access point transmit power level and the measured power level. In some embodiments, communication station 104 may measure an average received power level of OFDM subcarriers of an OFDM subchannel, and the path loss may be estimated from an access point transmit power level and the measured power level. Communication station 104 may request the link margin from access point 102 and the access point transmit power level used by access point 102 prior to estimating the path loss. Communication station 104 may also calculate the sensitivity of access point 102 by subtracting the path loss and the access point link margin from the transmit power level of communication station 104.

The link margin variation may be estimated from an access point transmit power variation, an indoor path loss variation, and/or a receiver power measurement error of communication station 104, although the scope of the invention is not limited in this respect. In some embodiments, the path loss variation may be based on, for example, whether the access point is indoors or outdoors. The access point transmit power variation may be based on predetermined characteristics of access point 102. The receiver power measurement error may be based on predetermined characteristics of communication station 104. In some embodiments, the access point transmit power variation may range from approximately one decibel (dB) to three dB, although the scope of the invention is not limited in this respect. In some embodiments, the indoor path loss variation may range from approximately one dB to three dB, although the scope of the invention is not limited in this respect. In some embodiments, the receiver power measurement error of communication station 104 may range from approximately one dB to three dB, although the scope of the invention is not limited in this respect. In these embodiments, the link margin variation may range from approximately three dB to nine dB, although the scope of the invention is not limited in this respect.

In some embodiments, communication station 104 may report a communication station link margin and a transmit power level of communication station 104 to access point 102. In response, access point 102 may determine whether to adjust its transmit power level based on the reported communication station link margin and transmit power level, although the scope of the invention is not limited in this respect. Prior to reporting, communication station 104 may determine a data rate of an OFDM symbol received at the communication station, and it may determine a sensitivity of communication station 104 based on the data rate. The communication station's sensitivity may be predetermined or precalibrated for various data rates. Communication station 104 may also calculate the communication station link margin from the data rate and the communication station sensitivity. In some embodiments, communication station 104 may look up the communication station sensitivity in either a look-up table or a calibration table based on the data rate.

In some embodiments, communication stations 104, 106 and/or 108 may operate as part of a wireless local area network communicating orthogonal division multiplexed signals with access point 102. In these embodiments, the OFDM signals may be within a subchannel comprising a plurality of OFDM subcarriers, although the scope of the invention is not limited in this respect. In these embodiments, a communication station, such as communication station 104 may measure an average received power level of the subcarriers of the subchannel at either radio-frequency or baseband. In some embodiments, the transmit power level may initially be set at a predetermined maximum level (e.g., +16 dBm), and it may be reduced accordingly. In some embodiments, when the OFDM signals are within a wideband channel comprising two or more frequency-separated subchannels, communication station 104 may measure an average received power level of the subcarriers associated with each of the subchannels to determine an average receive power level for each subchannel.

In some embodiments, communication station 104 may perform an open-loop transmit power control procedure when an access point transmit power level is not received from access point 102 in response to a request from communication station 104. In these embodiments, the open-loop transmit power control procedure may comprise retrieving a receiver sensitivity of communication station 104 based on a data rate of a received OFDM symbol from a table, and reducing the transmit power level by a predetermined amount when the received power level exceeds the sensitivity by a predetermined amount. In some embodiments, a difference between the received power level and receiver sensitivity may be calculated. In some embodiments, the transmit power level of communication station 104 may be reduced by approximately three dB when the received power level exceeds the sensitivity by thirteen dB, although the scope of the invention is not limited in this respect. In some other embodiments, the transmit power level may be increased in predetermined amounts when the received power level does not exceed the sensitivity by a predetermined amount. Examples of some suitable open-loop transmit power control procedures are described in U.S. patent application Ser. No. 10/314,411, entitled "METHOD AND APPARATUS TO CONTROL TRANSMISSION" filed Dec. 09, 2002, assigned to the same assignee as the present application.

In accordance with some embodiments, access point 102 and communication stations 104, 106 and/or 108 may symbol-modulate the subcarriers in accordance with individual subcarrier modulation assignments. This may be referred to as adaptive bit loading (ABL). Accordingly, one or more bits may be represented by a symbol modulated on a subcarrier. The modulation assignments for the individual subcarriers may be based on the channel characteristics or channel conditions for that subcarrier, although the scope of the invention is not limited in this respect. In some embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation orders with higher data communication rates per subcarrier may also be used.

Figure 2:
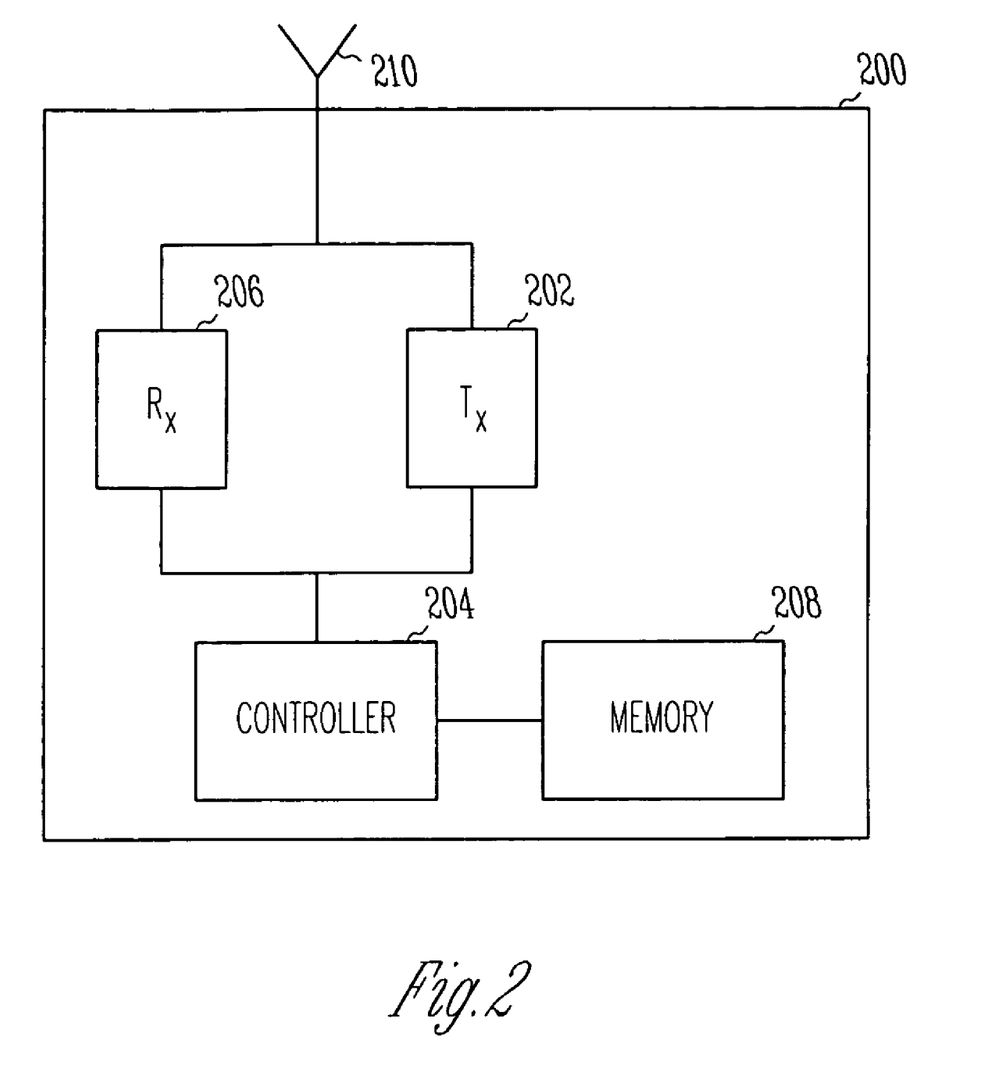
FIG. 2 is a block diagram of a communication station in accordance with some embodiments of the invention.

FIG. 2 is a block diagram of a communication station in accordance with some embodiments of the invention. Communication station 200 may be suitable for use as one or more of communication stations 104, 106 and/or 108 (FIG. 1). Communication station 200 may also be suitable for use as an access point, such as access point 102 (FIG. 1). Communication station 200 includes transmitter 202 to transmit signals, such as OFDM signals, to an access point or other wireless communication device. Controller 204 may adjust a communication station transmit power level of transmitter 202 based on a sensitivity of the access point, a path loss of a communication signal path between communication station 200 and the access point, and/or a link margin variation of the communication signal path. Communication station 200 may also comprise receiver 206 to receive orthogonal frequency division multiplex communication signals through antenna 210. Controller 204 may measure a received power level and may estimate the path loss from an access point transmit power level and/or the measured received power level.

In some embodiments, controller 204 may configure transmitter 202 to send a request message to an access point to request the access point's transmit power level and an access point link margin. The access point may calculate its link margin. Controller 204 may calculate the access point's sensitivity by subtracting the path loss and the access point's link margin from the transmit power level currently being used by communication station 200.

In some embodiments, controller 204 may estimate the link margin variation from an access point transmit power variation, an indoor path loss variation, and/or a receiver power measurement error of communication station 200. Controller 204 may, for example, determine the path loss variation based on whether the access point is either indoors or outdoors. Controller 204 may determine the access point transmit power variation based on predetermined characteristics of the access point. Controller 204 may determine the receiver power measurement error based on predetermined characteristics of communication station 200.

In some embodiments, controller 204 may configure transmitter 202 to report a communication station link margin and a transmit power level of communication station 200 to the access point. In response, the access point may determine whether or not to adjust the access point's transmit power level based on the reported communication station link margin and the communication station's transmit power level. Prior to configuring the transmitter to report, controller 204 may determine a data rate of an OFDM symbol received by communication station 200. Controller 204 may also determine a communication station sensitivity based on the data rate. The communication station sensitivity may be either predetermined or precalibrated for various data rates. Controller 204 may also calculate the communication station link margin from the data rate and the communication station sensitivity. In some embodiments, predetermined or precalibrated sensitivities for the communication station may be stored in memory 208 in a device sensitivity table or other suitable data structure. The table below is an example of a suitable sensitivity table, although the scope of the invention is not limited in this respect.

| Data Rate | Sensitivity (dBm) |
|---|---|
| 6 Mbit/s | −82 |
| 9 Mbit/s | −81 |
| 12 Mbit/s | −79 |
| 18 Mbit/s | −77 |
| 24 Mbit/s | −74 |
| 36 Mbit/s | −70 |
| 48 Mbit/s | −66 |
| 54 Mbit/s | −65 |

In some embodiments, controller 204 may perform an open-loop transmit power control procedure when a response is not received by communication station 200 for the access point transmit power level. The open-loop transmit power control procedure may include controller 204 retrieving a receiver sensitivity of receiver 206 based on a data rate of a received OFDM symbol from a table, and reducing the communication station transmit power level by a predetermined amount when the received power level exceeds the sensitivity by a predetermined amount. In some embodiments, the open-loop transmit power control procedure may comprise increasing the communication station transmit power level when the received power level does not exceed the sensitivity by a predetermined amount.

In some embodiments, controller 204 may comprise one or more digital signal processors. Antenna 210 may comprise one or more directional or omnidirectional antennas, including, for example, dipole antennas, monopole antennas, loop antennas, microstrip antennas or other types of antennas suitable for reception and/or transmission of radio frequency signals by communication station 200.

Although communication device 200 is illustrated as having several separate functional elements, one or more of the functional elements may be combined and may be implemented by combinations of software-configured elements, such as processing elements including digital signal processors (DSPs), and/or other hardware elements. For example, processing elements, such as controller 204, may comprise one or more microprocessors, DSPs, application specific integrated circuits (ASICs), and combinations of various hardware and logic circuitry for performing at least the functions described herein.

Figure 3:
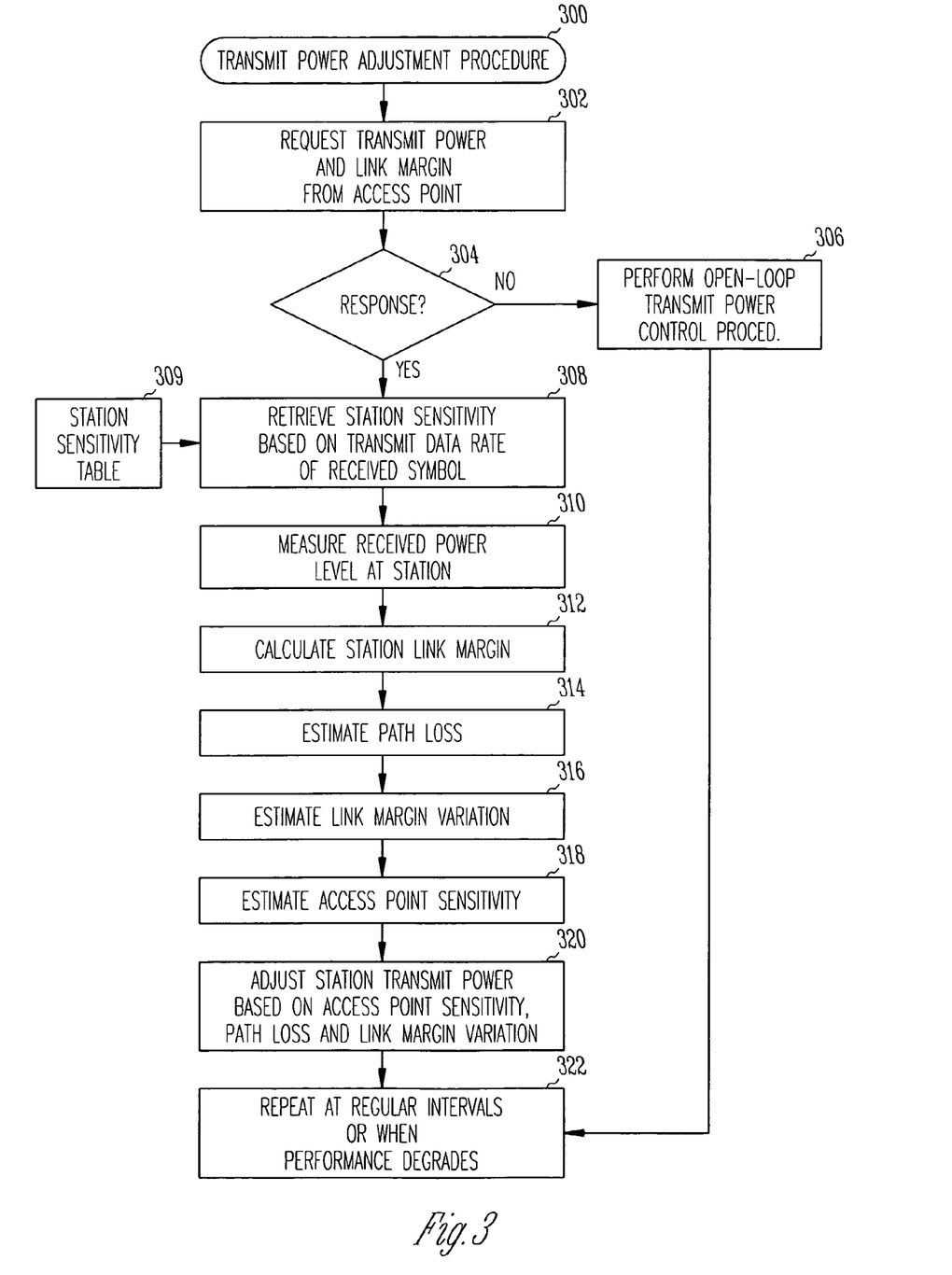
FIG. 3 is a flow chart of a transmit power adjustment procedure in accordance with some embodiments of the invention.

FIG. 3 is a flow chart of a transmit power adjustment procedure in accordance with some embodiments of the invention. Transmit power adjustment procedure 300 may be performed by a wireless communication device, such as one or more of communication stations 104, 106 and/or 108 (FIG. 1) Transmit power adjustment procedure 300 may also be performed concurrently by an access point, such as access point 102 (FIG. 1). Although procedure 300 is described as being performed by a communication station which adjusts transmit power level for communications with an access point, procedure 300 is equally applicable to an access point which adjusts its transmit power level for communications with one or more communication stations.

Operation 302 may include requesting a transmit power level and a link margin from an access point. The access point may calculate the link margin prior to sending the requested information to the communication station.

Operation 304 determines whether or not a response to the request of operation 302 is received from the access point. When a response is not received, operation 306 may be performed. When a response is received, operation 308 may be performed.

Operation 306 may include performing an open-loop transmit power control procedure, although the scope of the invention is not limited in this respect. In some embodiments, operation 306 may comprise retrieving a receiver sensitivity of the communication station based on a data rate of a received OFDM symbol from a table, and reducing the communication station's transmit power level by a predetermined amount when a received power level exceeds the sensitivity by a predetermined amount.

Operation 308 comprises retrieving a sensitivity of the communication station based on the data rate of a received OFDM symbol. The communication station may determine the data rate of an OFDM symbol received by the communication station, and it may determine the communication station's sensitivity based on the data rate. In some embodiments, the communication station's sensitivity may be predetermined or precalibrated for various data rates, and it may be stored in station sensitivity table 309.

Operation 310 includes measuring a power level of OFDM signals received at the communication station from the access point.

Operation 312 includes calculating the communication station's link margin from the received power level measured in operation 310 and the sensitivity of the communication station determined in operation 308. Operation 312 may be performed for reporting purposes.

Operation 314 includes estimating the path loss from the access point transmit power level received in operation 302 and the received power level measured in operation 310.

Operation 316 includes estimating a link margin variation from an access point transmit power variation, an indoor path loss variation, and/or a receiver power measurement error of the communication station.

Operation 318 may comprise estimating the access point sensitivity by subtracting the path loss estimated in operation 314 and the access point link margin received in operation 302 from a current transmit power level of the communication station.

Operation 320 may include adjusting the transmit power level of the communication station based on the access point sensitivity estimated in operation 318, the path loss estimated in operation 314, and/or the link margin variation estimated in operation 316.

Operation 322 may repeat procedure 300 at regular intervals to allow the transmit power level to be dynamically changed in response to changes in the environment and movement of the communication devices. In some embodiments, operation 300 may include measuring a signal-to-noise ratio (SNR) or packet error rate, and repeating procedure 300 when performance degrades based on these measurements.

As part of procedure 300, the communication station's link margin and transmit power level may be reported to an access point. In some embodiments, the access point may determine whether to adjust the access point transmit power level based on the reported communication station link margin and transmit power level, although the scope of the invention is not limited in this respect.

Although the individual operations of procedure 300 are illustrated and described as separate operations, one or more of the individual operations may be performed concurrently, and nothing requires that the operations be performed in the order illustrated. Although procedure 300 is described as being performed by communication station, such as communication station 104 (FIG. 1), procedure 300 is equally applicable to an access point, such as access point 102 (FIG. 1). Furthermore, in some embodiments, procedure 300 may be equally applicable to peer-to-peer communications between communications stations.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A method comprising adjusting a communication station transmit power level for orthogonal frequency-division multiplexed signal transmissions to an access point based on an access point sensitivity, a path loss, and a link margin variation, wherein the access point sensitivity is calculated by subtracting the path loss and an access point link margin from the communication station transmit power level.

2. The method of claim 1 further comprising:

measuring a received power level of orthogonal frequency-division multiplexed signals at a communication station; and estimating the path loss from an access point transmit power level and the measured received power level.

3. The method of claim 2 further comprising requesting the access point transmit power level from the access point prior to estimating the path loss, the access point transmit power level having been used by the access point to transmit the orthogonal frequency-division multiplexed signals.

4. The method of claim 3 further comprising performing an open-loop transmit power control procedure when the access point transmit power level is not received from the access point,
wherein the open-loop transmit power control procedure includes:
retrieving a communication station receiver sensitivity based on a data rate of an orthogonal frequency-division multiplexed symbol from a table; and
reducing the communication station transmit power level by a first amount when the received power level exceeds the communication station receiver sensitivity by a second amount.

5. The method of claim 1 further comprising requesting the access point link margin from the access point prior to calculating the access point sensitivity.

6. The method of claim 5 wherein the access point calculates the access point link margin from either a ratio of a received signal-to-noise ratio and a desired signal-to-noise ratio, or an access point received power level and the access point sensitivity.

7. The method of claim 1 further comprising estimating the link margin variation from at least one of an access point transmit power variation, a path loss variation, and a receiver power measurement error of the communication station.

8. The method of claim 7 wherein the path loss variation is based on whether the access point is indoors or outdoors,
wherein the access point transmit power variation is based on characteristics of the access point, and
wherein the receiver power measurement error is based on characteristics of a communication station.

9. The method of claim 1 further comprising reporting a communication station link margin and the communication station transmit power level to the access point,
wherein the access point is to determine whether to adjust an access point transmit power level based on the communication station link margin and transmit power level.

10. The method of claim 2 wherein the method is performed by the communication station operating as part of a wireless local area network communicating orthogonal division multiplexed signals with the access point,
wherein the orthogonal frequency-division multiplexed signals are within a subchannel comprising a plurality of orthogonal frequency-division multiplexed subcarriers, and
wherein each subcarrier of the subchannel has a null at substantially a center frequency of other subcarriers of the subchannel.

11. The method of claim 10 wherein the measuring comprises measuring an average received power level across the subcarriers of the subchannel,
wherein the communication station transmit power level is initially set at a predetermined maximum level, and
wherein adjusting comprises reducing the communication station transmit power level.

12. The method of claim 11 wherein the orthogonal frequency-division multiplexed signals are within a wideband channel comprising two or more frequency-separated subchannels,
wherein each of the subchannels has an associated plurality of orthogonal subcarriers,
wherein each subcarrier of an associated subchannel has a null at substantially a center frequency of other subcarriers of the associated subchannel,
wherein the adjusting comprises adjusting a communication station transmit power level for each of the two or more subchannels, and
wherein the measuring comprises measuring an average received power level of the plurality of subcarriers associated with each of the subchannels.

13. A method comprising:
adjusting a communication station transmit power level for orthogonal frequency-division multiplexed signal transmissions to an access point based on an access point sensitivity, a path loss, and a link margin variation;
reporting a communication station link margin and the communication station transmit power level to the access point,
wherein the access point is to determine whether to adjust an access point transmit power level based on the communication station link margin and transmit power level,
wherein the method further comprises prior to the reporting:
determining a data rate of an orthogonal frequency-division multiplexed symbol received by a communication station;
determining a communication station sensitivity based on the data rate, the communication station sensitivity being either predetermined or precalibrated for various data rates; and
calculating the communication station link margin from the data rate and the communication station sensitivity,
wherein the determining the communication station sensitivity comprises looking up the communication station sensitivity in a table based on the data rate.

14. A method comprising adjusting a communication station transmit power level for orthogonal frequency-division multiplexed signal transmissions to an access point based on an access point sensitivity, a path loss, and a link margin variation,
wherein the method comprises:
measuring an average power level across orthogonal frequency-division multiplexed subcarriers of a subchannel received by a communication station;
estimating the path loss from an access point transmit power level and the measured average power level;
calculating the access point sensitivity by subtracting the path loss and an access point link margin from the communication station transmit power level;
estimating the link margin variation from at least one of an access point transmit power variation, an indoor path loss variation, and a receiver power measurement error of the communication station; and
requesting the access point transmit power level and the link margin from the access point prior to calculating the access point sensitivity,
wherein the adjusting comprises setting the communication station transmit power level by an amount substantially comprising the sum of the access point sensitivity, the path loss and the link margin variation.

15. A communication station comprising:
a transmitter to transmit orthogonal frequency-division multiplexed signals to an access point;
a controller to adjust a communication station transmit power level of the transmitter based on an access point sensitivity, a path loss, and a link margin variation; and a receiver to receive orthogonal frequency division multiplex communication signals, wherein the controller is to measure a received power level of the orthogonal frequency-division multiplexed signals and estimate the path loss from an access point transmit power level and the measured received power level, wherein the controller is to configure the transmitter to report a communication station link margin and the communication station transmit power level to the access point, wherein the access point is to responsively determine whether to adjust the access point transmit power level based on the reported communication station link margin and communication station transmit power level, wherein prior to configuring the transmitter to report, the controller is to:

determine a data rate of an orthogonal frequency-division multiplexed symbol received by the receiver;

determine a communication station sensitivity based on the data rate, the communication station sensitivity being either predetermined or precalibrated for various data rates; and calculate the communication station link margin from the data rate and the communication station sensitivity.

16. The communication station of claim 15 wherein the controller is to estimate the link margin variation from at least one of an access point transmit power variation, a path loss variation, and a receiver power measurement error of the communication station.

17. The communication station of claim 16 wherein the controller is to determine the path loss variation based on whether the access point is indoors or outdoors, wherein the access point transmit power variation is based on characteristics of the access point, and wherein the receiver power measurement error is based on characteristics of the communication station.

18. A communication station comprising:

a transmitter to transmit orthogonal frequency-division multiplexed signals to an access point;

a controller to adjust a communication station transmit power level of the transmitter based on an access point sensitivity, a path loss, and a link margin variation; and a receiver to receive orthogonal frequency division multiplex communication signals, and wherein the controller is to measure a received power level of the orthogonal frequency-division multiplexed signals and estimate the path loss from an access point transmit power level and the measured received power level, wherein the controller is to configure the transmitter to send a request message to the access point to request the access point transmit power level and an access point link margin prior to estimating the path loss, wherein the controller is to calculate the access point sensitivity by subtracting the path loss and the access point link margin from the communication station transmit power level, wherein the controller comprises a digital signal processor, and wherein the controller is to perform an open-loop transmit power control procedure when the access point transmit power level is not received from the access point, wherein as part of the open-loop transmit power control process, the controller is to:

retrieve a communication station receiver sensitivity based on a data rate of an orthogonal frequency-division multiplexed symbol from a table; and reduce the communication station transmit power level by a first amount when the received power level exceeds the communication station receiver sensitivity by a second amount.

19. A system comprising:

a substantially omnidirectional antenna;

a transmitter to transmit orthogonal frequency-division multiplexed signals to an access point via the antenna; and a controller to adjust a communication station transmit power level of the transmitter based on an access point sensitivity, a path loss, and a link margin variation, wherein the access point sensitivity is calculated by the controller by subtracting the path loss and an access point link margin from the communication station transmit power level.

20. The system of claim 19 further comprising a receiver to receive orthogonal frequency division multiplex communication signals, wherein the controller is to measure a received power level of the orthogonal frequency-division multiplexed signals and estimate the path loss from an access point transmit power level and the measured received power level, wherein the controller is to configure the transmitter to send a request message to the access point to request the access point transmit power level and an access point link margin prior to estimating the path loss.

21. The system of claim 19 wherein the controller is to estimate the link margin variation from at least one of an access point transmit power variation, a path loss variation, and a receiver power measurement error of the receiver, wherein the controller is to determine the path loss variation based on whether the access point is indoors or outdoors, wherein the access point transmit power variation is based on characteristics of the access point, and wherein the receiver power measurement error is based on characteristics of the receiver.

22. A system comprising:

a substantially omnidirectional antenna;

a transmitter to transmit orthogonal frequency-division multiplexed signals to an access point via the antenna; and a controller to adjust a communication station transmit power level of the transmitter based on an access point sensitivity, a path loss, and a link margin variation, wherein the system comprises a communication station that is to operate as part of a wireless local area network communicating orthogonal division multiplexed signals with the access point, and wherein the orthogonal frequency-division multiplexed signals are within a subchannel comprising a plurality of orthogonal frequency-division multiplexed subcarriers, and wherein each subcarrier of the subchannel has a null at substantially a center frequency of other subcarriers of the subchannel, wherein the controller comprises a digital signal processor, wherein the controller is to perform an open-loop transmit power control procedure when the access point transmit power level is not received from the access point, and wherein as part of the open-loop transmit power control procedure, the controller is to:

retrieve a communication station receiver sensitivity based on a data rate of an orthogonal frequency-division multiplexed symbol from a table; and reduce the communication station transmit power level by a first amount when the received power level exceeds the communication station receiver sensitivity by a second amount.

23. A computer readable medium that stores instructions for execution by one or more processors, causing said processors to perform operations comprising adjusting a communication station transmit power level for orthogonal frequency-division multiplexed signal transmissions to an access point based on an access point sensitivity, a path loss, and a link margin variation, wherein the operations further comprise:

measuring a received power level of orthogonal frequency-division multiplexed signals at a communication station;

estimating the path loss from an access point transmit power level and the measured received power level; and calculating the access point sensitivity by subtracting the path loss and an access point link margin from the communication station transmit power level.

24. The computer-readable medium of claim 23 wherein the instructions, when further executed by one or more of said processors cause said processors to perform operations further comprising:

estimating the link margin variation from at least one of an access point transmit power variation, a path loss variation, and a receiver power measurement error of the communication station;

requesting the access point transmit power level from the access point prior to estimating the path loss, the access point transmit power level having been used by the access point to transmit the orthogonal frequency-division multiplexed signals; and requesting the access point link margin from the access point prior to calculating the access point sensitivity.

* * * * *